United States Patent
Kretschmer et al.

[11] Patent Number: 6,106,007
[45] Date of Patent: Aug. 22, 2000

[54] AIRBAG DEVICE

[75] Inventors: Jürgen Kretschmer, Esslingen; Klaus Möller; Reinhard Schmale, both of Wuppertal, all of Germany

[73] Assignee: TRW Occupant Restraint Systems GmbH & Co. KG, Alfdorf, Germany

[ * ] Notice: This patent is subject to a terminal disclaimer.

[21] Appl. No.: 09/315,291

[22] Filed: May 20, 1999

Related U.S. Application Data

[63] Continuation of application No. 08/951,352, Oct. 16, 1997, Pat. No. 5,921,575.

[30] Foreign Application Priority Data

Oct. 18, 1996 [DE] Germany ............ 196 42 964

[51] Int. Cl.⁷ .................................................. B60R 21/22
[52] U.S. Cl. .................................................. 280/730.2
[58] Field of Search ...................... 280/728.2, 730.1, 280/730.2, 749, 732

[56] References Cited

U.S. PATENT DOCUMENTS

| | | | |
|---|---|---|---|
| 5,062,664 | 11/1991 | Bishop et al. | 280/728.2 |
| 5,291,575 | 3/1994 | Yanagawa et al. | 385/132 |
| 5,431,436 | 7/1995 | Mossi et al. | 280/728.1 |
| 5,468,012 | 11/1995 | Mihm | 280/728.2 |
| 5,540,459 | 7/1996 | Daniel | 280/730.2 |
| 5,588,668 | 12/1996 | Emambakhsh et al. | 280/778.2 |
| 5,755,457 | 5/1998 | Specht | 280/728.2 |
| 5,788,270 | 8/1998 | HÅland et al. | 280/729 |
| 5,899,486 | 5/1999 | Ibe | 280/728.2 |
| 5,921,576 | 7/1999 | Sinnhuber | 280/730.2 |

Primary Examiner—Paul N. Dickson
Attorney, Agent, or Firm—Tarolli, Sundheim, Covell, Tummino & Szabo L.L.P.

[57] ABSTRACT

An airbag device for a vehicle is described, which has an airbag consisting of an inflatable gas cushion, a gas generator for filling the airbag, a gas conduction pipe which extends through a separated region of the airbag, outlet openings in the gas conduction pipe, a profile strip with a shooting channel formed therein, in which the airbag laid in stacked folds is received in addition to the gas conduction pipe and attachment elements for holding the construction unit comprising the profile strip, airbag and gas conduction pipe.

21 Claims, 3 Drawing Sheets

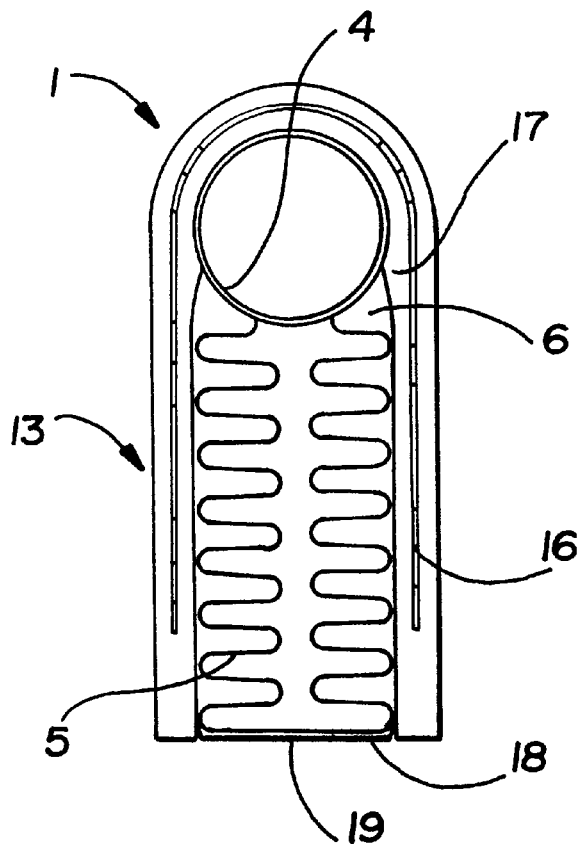
_Fig-3_
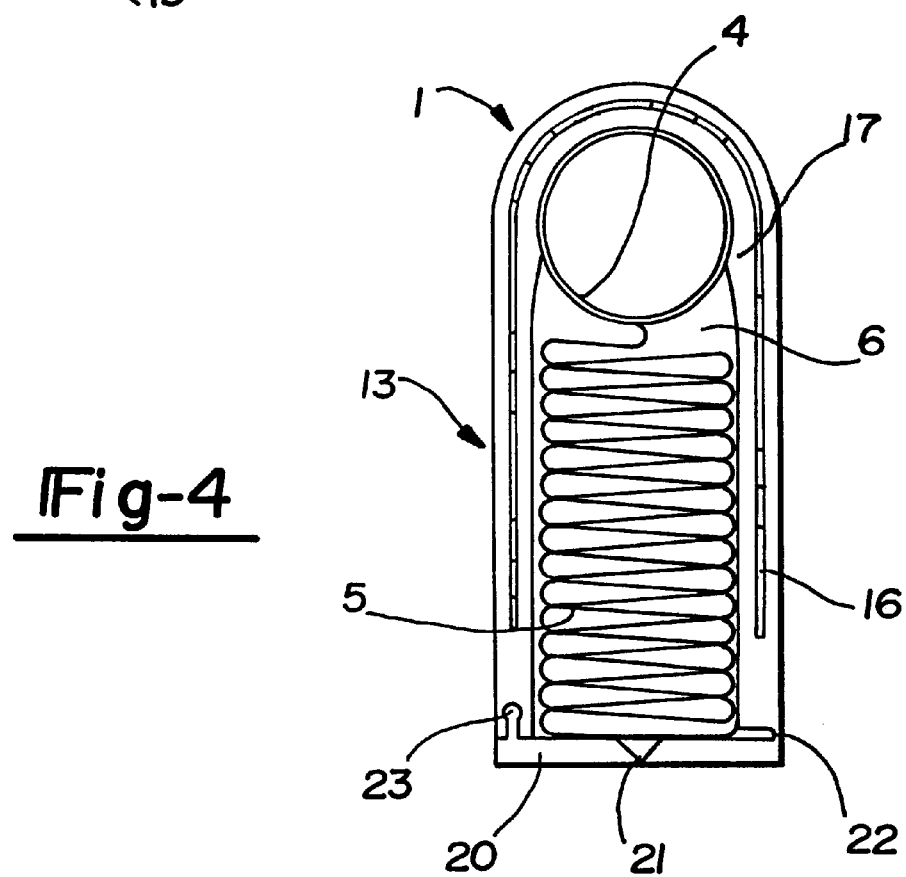
_Fig-4_

AIRBAG DEVICE

This is a continuation of U.S. patent application Ser. No. 08/951,352, filed Oct. 16, 1997 now U.S. Pat. No. 5,921,575.

BACKGROUND OF THE INVENTION

The invention relates to an airbag device for a motor vehicle.

A wide variety of designs of airbag devices have been disclosed and they offer effective protection of a vehicle occupant in the event of a traffic accident.

SUMMARY OF THE INVENTION

The invention is based on the object of providing a preassembled, modular, active head protection (airbag) system for motor vehicles.

To achieve this object, the invention proposes an airbag device for a motor vehicle, having an airbag which consists of an inflatable gas cushion, a gas generator for filling the airbag, a gas conduction pipe which extends through a separated region of the airbag, outlet openings in the gas conduction pipe, a profile strip with a shooting channel formed therein, in which the airbag laid in stacked folds is received in addition to the gas conduction pipe, and attachment elements for holding the construction unit comprising the profile strip, airbag and gas conduction pipe.

The profile strip with the airbag and gas conduction pipe can advantageously extend in each case along one side of the vehicle from the A-pillar to the C-pillar and be arranged on the vehicle body, in the transition region from the vehicle roof and one side wall of the vehicle.

The profile strip which receives the gas conduction pipe and the airbag within the shooting channel may be a component which is simple in terms of production and, in particular, is also cost-effective, and it preferably has an essentially U-shaped cross-section with two limbs and a bar which connects them together. In this case, the bar is expediently adapted to the shape of the gas conduction pipe which is supported thereon.

The profile strip may be made as an extruded or injection-molded plastic part, and it preferably consists of a thermoplastic, such as PP, PP-EPDM, TPE or PVC.

A particularly expedient further development of the invention consists in the fact that the profile strip is reinforced by an incorporated structure band consisting of metal, such as steel or aluminum. The airbag device can thus be used throughout the entire temperature range (−40° C.−+120° C.) required by users, since the mechanical properties are essentially determined by the metal structure band.

A further refinement of the invention provides for the limbs of the profile strip to diverge before the airbag and gas conduction pipe are introduced into the profile opening forming the shooting channel, and for the limbs of the profile strip to be aligned approximately parallel to one another after the airbag and gas conduction pipe have been introduced. The initially diverging limbs make assembly easier, that is to say mainly the introduction of the gas conduction pipe and the airbag into the shooting channel, and can be moved without difficulty into the desired alignment, such as a parallel position, by means of simple auxiliary equipment belonging to the prior art.

Particular advantages of the invention can be seen in the fact that the unfolding direction of the airbag is defined by the shooting channel, that there is linear support of the airbag during the unfolding operation and thus uniform unfolding, and that the installation site of the profile strip is freely selectable, since the natural rigidity of the airbag device can be varied within broad limits by the choice of material and the material combination for the profile strip.

Furthermore, the restraint, i.e. the resistance that the airbag has to overcome during unfolding, can be varied within broad limits, specifically by the structure band incorporated in the profile strip, by the angle between the flanks (profile limbs) and furthermore by the fact that the profile strip has means for closing the profile opening or the shooting channel. For this purpose, provision may be made for the profile strip to have a continuous closure lip, on the opening side, which may, in particular, also have a continuous tear-open seam formed, for example, by a perforation. The closure lip is advantageously formed on along an edge at a free end of the limb of the profile strip and, with the other edge, forms a joint with the second limb of the profile strip, in which case the joint may be a clip, welded, bonded or sewn joint.

Restraint of the airbag can also be achieved in that a shrink tube is arranged around the gas conduction pipe and the folded airbag, which tube has a defined tear-open seam which coincides with the orifice of the shooting channel.

A further expedient refinement of the invention provides for the limbs of the profile strip to have beads or the like which can be overcome by the gas conduction pipe during assembly to secure the gas conduction pipe in its position.

The gas conduction pipe and the profile strip should have a configuration which follows the contour of the body, which can be realized by the gas conduction pipe and, if appropriate, also the profile strip being designed in a curve, such as an elongated curve. During the bending of the profile strip, attention must be paid to the fact that its opening cross-section remains unchanged over the total axial extent.

The fastening elements for the airbag device expediently comprise simple clips which can be preassembled on the profile strip or on the body, are arranged adjacently in rows, and should be made of plastic or preferably of metal, such as spring plate.

It is important for the folded airbag to have a band securement which defines the span line for the unfolded airbag.

An exemplary embodiment of the invention is explained in greater detail below with reference to the drawings.

BRIEF DESCRIPTION OF THE DRAWINGS

FIG. 3 depicts a cross-sectional view through the airbag device according to a first embodiment.

FIG. 4 depicts a cross-sectional view through the airbag device according to a second embodiment.

DETAILED DESCRIPTION OF THE PREFERRED EMBODIMENTS

Figure 1:
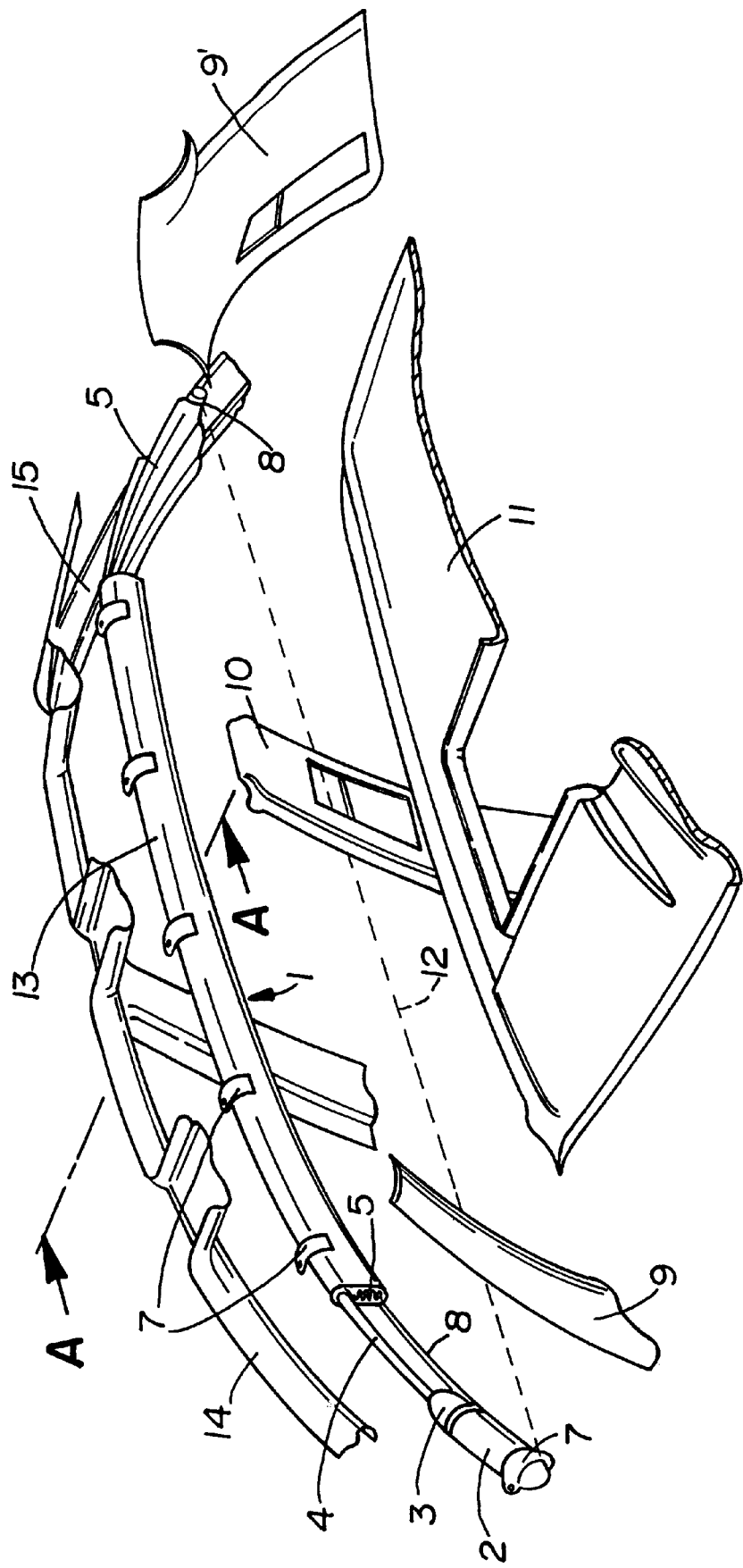
FIG. 1 depicts an exploded perspective view of an airbag device with a vehicle body.
Figure 2:
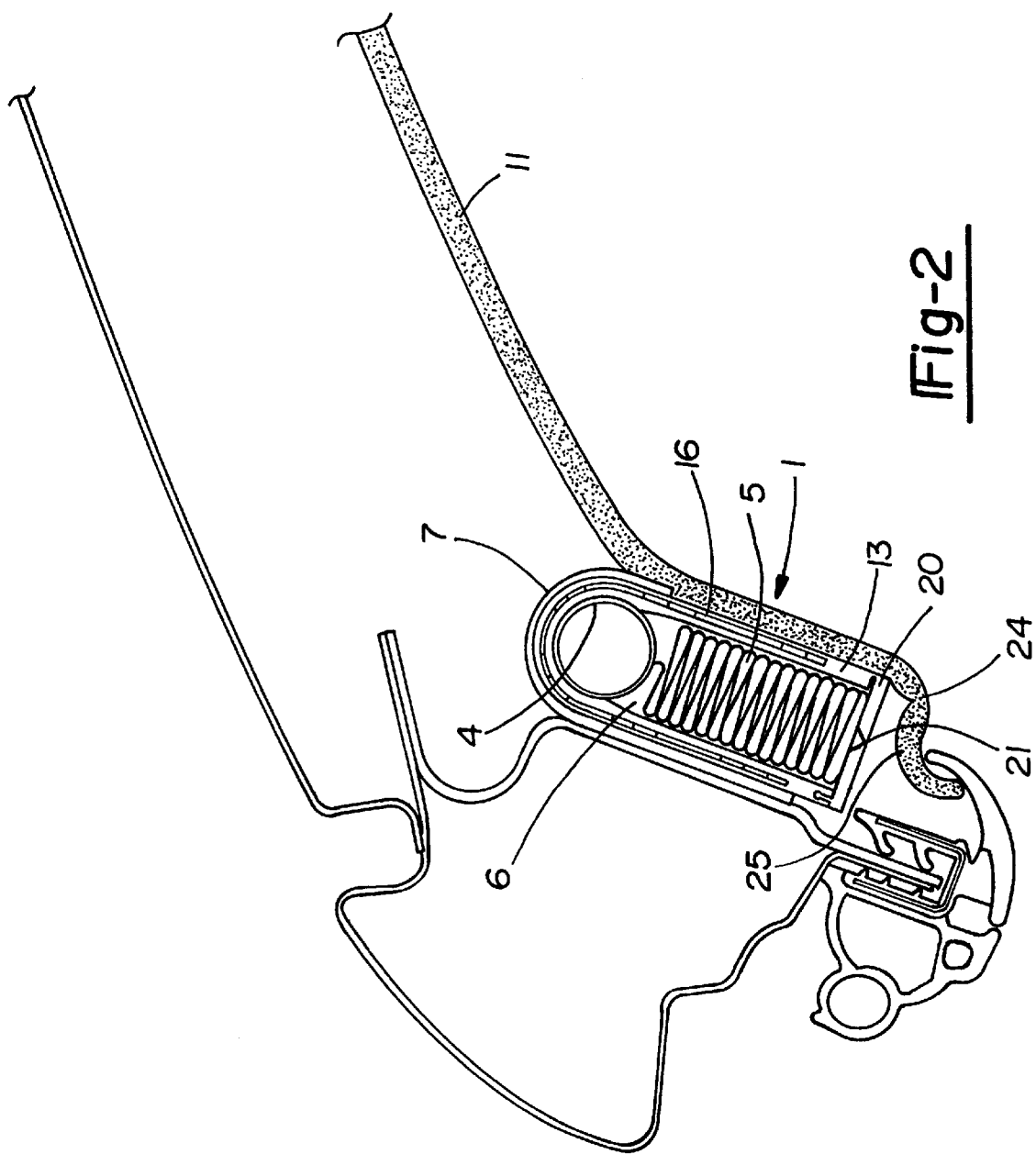
FIG. 2 depicts a cross-sectional view of the air bag device and vehicle body following the line A—A in FIG. 1.

Referring now to the Figures, the novel airbag device is a head protection module which is denoted by the reference numeral 1 and is to be arranged in the transition region from the vehicle roof to each side wall of the vehicle in a manner which can be seen in FIGS. 1 and 2. The head protection module comprises a gas generator 2, an adaptor 3 to produce a connection between the gas generator 2 and a gas conduction pipe 4, a folded airbag 5 and a profile strip 13 made with a shooting channel 6. The airbag device extends from the A-pillar 14 (instrument panel region) up to the C-pillar 15 and is adapted to the course of the body. The airbag device is to be attached to the vehicle body by means of clips 7, in which case the clips 7, which may be made of spring plate, can be preassembled on the body or on the airbag device. Holding/spanning bands 8 define a span line 12.

For reasons of completeness, FIG. 1 illustrates a modified pillar cladding 9 for the A-pillar 14, a modified pillar cladding 9 for the C-pillar, a B-pillar cladding 10 and a shaped roof 11.

FIG. 3 shows a cross-section of the airbag device and demonstrates that the shooting channel 6 is made in a profile strip 13 which has a U-shaped cross-section with two limbs and a bar which connects them together. The profile strip expediently consists of a thermoplastic material and is made by injection-molding or extrusion methods. An incorporated structure band 16 gives the profile strip 13 sufficient rigidity to meet the technical requirements. The gas conduction pipe 4 and the airbag 5 stacked in folds are received inside the shooting channel 6. The gas conduction pipe 4 is seated in a separate region of the airbag which may be formed by sewing. Outlet openings (not shown) in the gas conduction pipe 4 are directed towards the folded airbag in order to unfold it or rapidly inflate it when it is required.

Inside the shooting channel 6, the limbs of the profile strip 13 have beads 17 which narrow the shooting channel 6. The beads 17 can easily be overcome by the gas conduction pipe 4 when the latter is introduced, but they then secure its position inside the shooting channel 6.

In the exemplary embodiment according to FIG. 3, the shooting channel 6 is designed to be open. In contrast, the airbag 5 laid in folds is enclosed by a shrink tube 18 which has a tear-open seam 19 in the region of the orifice of the shooting channel. The tear-open seam 19 is designed in such a way that it opens at a specific pressure of the filling gas, and the airbag 5 can unfold into the vehicle interior.

In the exemplary embodiment according to FIG. 4, the difference compared to that of FIG. 3 consists essentially in the fact that the shooting channel 6 is closed by a closure lip 20, and the airbag 5 is not surrounded by a shrink tube 18. In this case, the closure lip 20 thus exerts a restraining effect on the filling gas generated. At a specific pressure of the filling gas, the closure lip 20 can open, for example along a tear-open seam 21 formed therein.

The closure lip 20 may be formed at an edge at a free end 22 of one limb on the profile strip 13, e.g. in the manner of a film hinge, and at an edge at a free end 23 of the other limb form a joint, e.g. a clip joint, with the profile strip 13. This joint may be a clip, welded, bonded or sewn.

FIG. 2 illustrates the arrangement of the novel airbag device in a vehicle and the alignment of the shooting channel 6 which permits the airbag to unfold into a position which provides a head protection for a vehicle occupant. In the intended and illustrated airbag device, the inflated airbag comes into effect between the head of a vehicle occupant and the side window of a vehicle which is adjacent to him/her, so that the head of the vehicle occupant cannot impact either against the side window or against hard regions of the frame of the body.

As shown in FIG. 2, the airbag device can be covered by the shaped roof 11, an intended bending point 24 in the shaped roof 11 ensuring that an edge region 25 instantly exposes the shooting channel 6 when the airbag unfolds.

A sequence of assembly is explained briefly below.

EXAMPLE 1

Produce the airbag by sewing a cushion with a sewn section to provide an insertion tunnel for the gas filling pipe.

Fold the airbag in an extended position.

Secure the folds with shrink tubing, in which case the film is to be provided with a tear-open seam.

Bend the gas conduction pipe according to the contour/body (elongated bending) and punch out outlet openings (preferably) in the bending device.

Insert the bent gas conduction pipe into the airbag/shrink tube unit.

Produce an infinitely extruded profile strip, cut it to the desired length and, if necessary, bend it to the contour of the body (elongated bending).

Introduce the preassembled unit (gas conduction pipe, airbag, shrink tube) into the shooting channel of the profile strip and position undercuts around the gas conduction pipe by a rolling operation, simultaneously aligning the profile limbs as required.

Attach the gas generator to the gas conduction pipe using the adaptor.

Insert the module into clamping clips (on the body).

Fix and secure the module to the gas generator fastening and to the projecting gas conduction pipe on the body using screws.

EXAMPLE 2

Produce the airbag by sewing a cushion with a sewn section to provide an insertion tunnel for the gas filling pipe.

Fold the airbag in an extended position.

Secure the folds at some points using bands.

Bend the gas conduction pipe according to the contour/body (elongated bending) and punch out outlet openings (preferably) in the bending device.

Insert the bent gas conduction pipe into the airbag/band securement.

Produce an infinitely extruded profile strip with a closure lip, cut it to the desired length and, if necessary, bend it to the contour of the body (elongated bending).

Introduce the preassembled unit (gas conduction pipe, airbag) into the shooting channel of the profile strip and position undercuts around the gas conduction pipe by a rolling operation, with simultaneous rolled alignment of the profile limbs.

Clip the closure lip into the undercut.

Attach the gas generator to the gas conduction pipe using the adaptor.

Insert the module into clamping clips (on the body).

Fix and secure the module to the gas generator fastening and to the projecting gas conduction pipe on the body using screws.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An airbag device for a motor vehicle, said airbag comprising:

an airbag comprising an inflatable gas cushions;

a gas generator for filling said airbag;

a gas conduction pipe extending through at least a portion of said airbag and having gas directing outlet openings in said airbag; and an envelope in which said airbag is located in a packed condition, and in which said gas conduction pipe is received and supported;

said envelope including a profile strip having a U-shaped cross section, said profile strip having two parallel limbs and a web interconnecting said limbs, said web having a surface adapted to the shape of said gas conduction pipe, said gas conduction pipe being supported in engagement with said surface;

said profile strip, said airbag, and said gas conduction pipe forming a preassembled unit;

said airbag device further including attachment elements for attaching said preassembled unit to a vehicle body.

2. The airbag device according to claim 1 wherein said profile strip, said airbag, and said gas conduction pipe extend along one side of said vehicle from an A-pillar to a C-pillar and are arranged on said vehicle body in a transition region from a vehicle roof of said vehicle and a side wall of said vehicle.

3. The airbag device according to claim 1 wherein said profile strip includes beads, said beads being moved apart from a first position by said gas conduction pipe during assembly, said beads being returned to said first position to secure said gas conduction pipe in its assembled position.

4. The airbag device according to claim 1 wherein said gas conduction pipe and said profile strip have a configuration which follows the contour of said vehicle body.

5. The airbag device according to claim 1 wherein said gas conduction pipe and said profile strip are curved.

6. The airbag device according to claim 1 further including attachment elements for attaching said airbag device to said vehicle, said attachment elements having clips which can be preassembled on said profile strip, said clips being arranged adjacently in a row.

7. The airbag device according to claim 1 wherein said airbag is provided with a band securement securing said airbag to said vehicle, said band securement defining a span line over which said airbag is inflated.

8. An airbag device for a motor vehicle, said airbag device comprising:

an airbag comprising an inflatable gas cushion;

a gas generator for filling said airbag; and an envelope in which said airbag is located in a packed condition;

said envelope including a profile strip made as a plastic part having a U-shaped cross-section defining a chamber, said profile strip having two planar parallel limbs, a web interconnecting said limbs, and a closure lip integrally molded with a free edge of one of said limbs and movable to a position attached to a free edge of the other of said limbs to close said chamber.

9. The airbag device according to claim 8 wherein said profile strip is made of a thermoplastic material.

10. The airbag device according to claim 9 wherein said profile strip is reinforced by an incorporated structure band made of metal.

11. The airbag device according to claim 8 wherein said closure lip has a continuous tear-open seam.

12. The airbag device according to claim 8 wherein said closure lip is formed on an edge of a free end of one of said limbs and, with an edge of a free end of the other of said limbs, forms a joint with said profile strip.

13. An airbag device for a motor vehicle, said airbag device comprising:

an airbag including an inflatable gas cushion;

a gas generator for filling said airbag;

a gas conduction pipe which extends through at least a portion of said airbag; and a profile strip in which said airbag is located in a packed condition;

said profile strip having two parallel limbs and a web interconnecting said limbs, said web having a surface shaped like a surface portion of said gas conduction pipe, said surface in continuous engagement with said surface portion.

14. The airbag device as defined in claim 13 further including a reinforcing structure embedded within said profile strip and corresponding in shape to said profile strip.

15. An airbag device for a motor vehicle, said airbag device comprising:

an airbag including an inflatable gas cushion;

a gas generator for filling said airbag;

a gas conduction pipe which extends through at least a portion of said airbag;

a profile strip for accommodating said airbag in a packed condition; and a reinforcing structure embedded within said profile strip and corresponding in shape to said profile strip.

16. The airbag device as defined in claim 15 wherein said profile strip has two parallel limbs and a web interconnecting said limbs, said web being adapted to the shape of said gas conduction pipe.

17. An airbag device for a motor vehicle, said airbag device comprising:

an airbag including an inflatable gas cushion;

a gas generator for filling said airbag;

a gas conduction pipe which extends through at least a portion of said airbag; and a profile strip for accommodating said airbag in a packed condition, said profile strip having beads for supporting said gas conduction pipe in said profile strip;

said airbag and said gas conduction pipe forming a single unit;

said beads moving away from each other during insertion of said unit into said profile strip and moving toward each other after insertion of said unit into said profile strip to support said unit in said profile strip.

18. The airbag device as defined in claim 17 wherein said profile strip includes two limbs and a web, said web being adapted to the shape of said gas conduction pipe and said beads being located on said limbs.

19. An airbag device for a motor vehicle, the motor vehicle having a roof and a side structure, said air bag device comprising:

an airbag comprising an inflatable gas cushion inflatable from the vehicle roof and into an inflated position along the vehicle side structure;

a gas generator for filling said airbag; and an envelope in which said airbag is located in a packed condition;

said envelope including a profile strip having a U-shaped cross-section, said profile strip having two planar parallel limbs and a web interconnecting said limbs, said envelope forming a shooting channel through which said airbag inflates downwardly between the vehicle side structure and an occupant of the vehicle, said shooting channel defining an unfolding direction of said airbag.

20. An airbag device for a motor vehicle, the motor vehicle having a roof and a side structure, said airbag device comprising:

an airbag comprising an inflatable gas cushion inflatable from the vehicle roof and into an inflated position along the vehicle side structure;

a gas generator for filling said airbag;

a gas conduction pipe which extends through at least a portion of said airbag and having outlet openings in said airbag; and an envelope in which said airbag is located in a packed condition, and in which said gas conduction pipe is received and supported;

said envelope including a profile strip having a U-shaped cross-section, said profile strip having two planar parallel limbs and a web interconnecting said limbs;

said airbag device further including a tubular shrink foil arranged around said gas conduction pipe and said airbag, said foil having a defined tear-open seam;

said airbag, said gas conduction pipe, and said shrink foil forming a preassembled unit which is introduceable into said profile strip.

21. An airbag device for a motor vehicle, said airbag device comprising:

an airbag comprising an inflatable gas cushion;

a gas generator for filling said airbag;

a gas conduction pipe which extends through at least a portion of said airbag and having outlet openings in said airbag; and an envelope in which said airbag is located in a packed condition, and in which said gas conduction pipe is received and supported;

said envelope including a profile strip having a U-shaped cross-section, said profile strip having two parallel limbs and a web interconnecting said limbs, said limbs diverging during introduction of said airbag and said gas conduction pipe into said profile strip and being parallel to one another after said gas conduction pipe and said airbag have been introduced into said profile strip.

* * * * *